3,310,601
CURING POLYEPOXIDES WITH A MIXTURE OF DIFUNCTIONAL AND POLYFUNCTIONAL MERCAPTANS
William De Acetis, Berkeley, and Herbert A. Newey, Lafayette, Calif., assignors to Shell Oil Company, New York, N.Y., a corporation of Delaware
No Drawing. Filed June 20, 1963, Ser. No. 289,433
12 Claims. (Cl. 260—831)

This invention relates to new curing agent compositions and to their preparation. More particularly, the invention relates to new compositions containing polymercaptans which are particularly useful as curing agents for polyepoxides, to the preparation of the compositions, and to their use as curing agents for the polyepoxides.

Specifically, the invention provides new and particularly useful compositions comprising a mixture of a liquid to solid polymercaptan containing more than two —SH groups per molecule, and a fluid liquid polymercaptan containing no more than two —SH groups per molecule. The invention further provides a process for using these new compositions for the conversion of polyepoxides to hard insoluble infusible products.

Difunctional polyepoxides will react with difunctional mercaptans to give linear polymers. These materials which are soluble and fusible have not, however, been found to be of any great practical utility. Cross-linked insoluble infusible product can be obtained by the use of a trifunctional merceptan with the difunctional polyepoxide. The difficulty with this, however, is the fact that the trifunctional mercaptans or higher mercaptans are generally viscous to solid materials. Such materials are difficult to utilize particularly in preparing solventless varnish systems and the like. Attempts have been made to lower the viscosity of these materials by the addition of conventional solvents, such as toluene, benzene, and the like, but this lowers the solids content of the mixture as well as the physical properties of the resulting cured product.

It is an object of the invention therefore to provide a new curing composition for polyepoxides that can be used to cure the material at the lower temperatures. It is a further object to provide new curing compositions which are fluid and can be easily utilized in coatings, laminating and adhesive compositions. It is a further object to provide a process for curing polyepoxides. It is a further object to provide a new process for converting polyepoxides at low temperatures into hard insoluble infusible castings having improved properties. These and other objects of the invention will be apparent from the following detailed description thereof.

It has now been discovered that these and other objects may be accomplished by the compositions of the invention comprising a mixture of a liquid to solid polymercaptan containing more than two —SH groups per molecule, and a fluid liquid polymercaptan containing no more than two —SH groups per molecule. It has been found that these compositions can be used to cure polyepoxides at low temperatures, e.g., around room temperature, to give products which are very hard and tough and have good resistance to solvents. In addition, the curing agent compositions are fluid and easy to handle during the mixing operation, and there is no need to utilize inert solvents to facilitate the mixing operation.

One component of the new curing compositions of the present invention comprise the polymercaptans containing more than two —SH groups per molecule. These compounds may be aliphatic, cycloaliphatic or heterocyclic and may be saturated or unsaturated. They preferably contain at least 3 and preferably 3 to 10 free —SH groups per molecule. These groups may be attached to the main chain or ring or on side chains attached thereto, and are preferably attached in the vicinity of activating groups, such as OH groups, ester groups, nitrile groups and the like.

Examples of polymercaptans include mercapto-substituted hydrocarbons, ester, ethers, urethanes, sulfides and the like, such as, for example, glycerol trithioglycolate, pentaerythritol tetrathioglycolate, 1,2,6-hexanetriol trithioglycolate, glycerol trithiolactate, 1,2,6-hexanetriol trithiolactate, 1,2,4 - butanetriol tri(2 - mercaptobutyrate), tri(4-mercaptobutyl)ether of glycerol, tetra(2-mercaptoethyl)ether of pentaerythritol, tributyl ether of 1,4,6-trimercapto-2,5,8-octanetriol, esters of mercapto-substituted alcohols and polycarboxylic acids, such as tetra(4-mercaptobutyl)pyromellitate, tri(3-mercaptobutyl)-1,2,4-butanetricarboxylate, tri(mercaptoethyl)trimellitate, tri(4-mercaptohexyl)-1,3,5-pentanetricarboxylate and mercaptoethyl esters of polyacrylic acid, mercaptobutyl esters of copolymers of methacrylic acid and styrene, 1,3,5-tri(mercaptomethyl) - 2,6 - dimethylbenzene, trimercaptophenol, bis(2,4-dimercaptobutyl)sulfide, bis(3,5-dimercaptohexyl)sulfide, bis(2,4-dimercaptobutyl)sulfone and the like, and mixtures thereof.

Other highly functional polymercaptans that can be used include those obtained by reacting polyepoxides with hydrogen sulfide. Examples of these are set out in U.S. 2,633,458. A special group of these include those obtained by reacting polyepoxides having more than 2 epoxy groups with hydrogen sulfide. Examples of such polyepoxides include, among others, glycidyl ethers of polyhydric alcohols containing at least three OH groups, such as glycerol, 1,2,6-hexanetriol, pentaerythritol, polyvinyl alcohol, polyallyl alcohol, 1,3,5-pentanetriol, pentaerythritol, polyvinyl alcohol, polyallyl alcohol, 1,3,5-pentanetriol, polyols obtained by reacting trihydric or higher alcohols with dibasic acids, polyols obtained by hydration of polyepoxides containing two or more epoxy groups, polyols obtained by homopolymerizing and copolymerizing vinyl or allylic monomers containing OH groups, such as hydroxyethyl acrylate and the like.

Other examples of polyepoxides possessing more than 2 epoxy groups include the glycidyl ethers of polyhydric phenols containing at least three OH groups, such as, for example, 1,3,5-trihydroxybenzene, 2,2-bis(4,6-dihydroxyphenyl)propane, 2,2-bis(4,6-dihydroxyphenyl)sulfone and 1,3,5-trihydroxynaphthalene, and polyhydric phenols obtained by reacting phenols with formaldehyde (novolac resins), such as represented by the formula

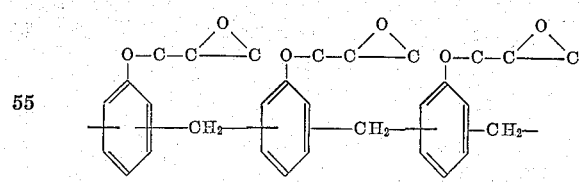

Another group of polyepoxides possessing more than 2 epoxy groups to be reacted with the hydrogen sulfide include, among others, those esters of epoxy alcohols and polycarboxylic acids containing at least three carboxyl groups, and alternatively, those esters of epoxy acids and polyhydric alcohols or phenols containing at least three OH groups. Examples of such esters include, among others, triglycidyl ester of 1,2,4-butanetricarboxylic acid, triglycidyl esters of 1,3,6-hexanetricarboxylic acid, triglycidyl ester of trimellitic acid, glycidyl ester of poly(acrylic acid), glycidyl esters of poly(methacrylic acid), glycidyl ester of pyromellitic acid, and ester of 2,3-epoxypropionic acid and 1,2,6-hexanetriol, ester of 2,3-epoxypropionic acid and glycerol, esters of 3,4-epoxybutanoic acid and polyvinyl alcohol and the like.

The highly functional mercaptan products are obtained by reacting the above-noted polyepoxides with hydrogen sulfide. The amount of the hydrogen sulfide to be employed may vary, but it is preferred to use an excess of the hydrogen sulfide. For best results preferred to add the polyepoxide and hydrogen sulfide in mol ratios of 1:20 to 1:4, and more preferably from 1:10 to 1:3. The reaction between the polyepoxide and hydrogen sulfide is preferably accomplished in the presence of catalysts, such as alkaline materials as sodium hydrosulfide, sodium ethoxide, sodium phenoxide and the like, or small amount of tertiary amine compounds, such as triethyl amine, benzyltrimethyl amine and the like. The amount of catalyst employed may vary from about .001% to about 5% by weight. The temperature employed in the reaction may vary over a wide range. In some instances, it may proceed at low temperatures, such as −15° C., to room temperatures. Preferred temperatures range from about 40° C. to 100° C. At the completion of the reaction, the polymercaptan can be recovered by any suitable means, such as distillation, extraction, filtration and the like.

Illustration of the above method for making highly functional polymercaptans is given below for the reaction of a glycidyl ether of a novolac resin with hydrogen sulfide:

1500 parts of a glycidyl ether of a phenol-formaldehyde resin having a molecular weight between 550–650 and an epoxy value of 0.56 eq./100 g. was dissolved in 3000 parts of dioxane and this mixture added with stirring over a 5 day interval to a flask containing a mixture of 12 parts of NaHS, 3000 parts of dioxane and 3000 parts of ethanol, which mixture had been saturated with hydrogen sulfide. The hydrogen sulfide saturation and stirring was continued for the 5 days and 1 additional day. At the end of that time, the catalyst was deactivated by the addition of an acid ion exchange resin (to drop to pH of 5 to 6). The mixture was filtered and solvents removed on steam batch at 1 mm. and 70° C. Product was a viscous organe oil. Total sulfur 14.6%, theory 15.2%, —SH 0.45, theory 0.47.

Other examples of polymercaptans include those obtained by reacting polythiuranes with hydrogen sulfide as disclosed and claimed in copending patent application Ser. No. 231,852, filed Oct. 19, 1962, and so much of that disclosure pertinent to the preparation of these polymercaptans is incorporated herein by reference.

Other polymercaptans include those obtained by adding hydrogen sulfide to polyunsaturated compounds, such as polybutadienes, polyisoprenes and the like. This addition is preferably accomplished in the presence of catalysts, such as isopropylamine. These mercaptan substituted polymers preferably having molecular weights varying from about 150 to about 10,000 as determined ebullioscopically in toluene.

Another group of special polymercaptans include the mercapto-substituted heterocyclic compounds, such as tri(mercaptomethyl)trioxanes, and the like, as described and claimed in copending application Ser. No. 284,370, filed May 31, 1963, now abandoned, and the aromatic compounds substituted with mercapto-containing side chains, such as described and claimed in copending application Ser. No. 284,322, filed May 31, 1963, and so much of these disclosures pertinent to the preparation of these new polymercaptans is incorporated herein by reference.

Especially preferred polymercaptans to be employed in the process of the invention include the esters of the polyhydric alcohols containing 3 to 10 hydroxyl groups, and mercapto-substituted mono- and polycarboxylic acids, the esters of the mercapto-substituted alcohols and polycarboxylic acids containing at least 3 carboxyl groups, the aducts of hydrogen sulfide and polyepoxides, the adducts of hydrogen sulfide and polythiuranes, the mercapto-substituted heterocyclic compounds and the aromatic compounds substituted with mercapto-substituted side chains. These special polymercaptans preferably contain from 3 to 10 —SH groups and no more than 25 carbon atoms.

The other component to be used in the curing agent compositions of the present invention comprise the liquid polymercaptans containing no more than two —SH groups, these also may be of aliphtic, cycloalphatic, aromatic or heterocyclic nature and substituted with other components, such as OH groups, ester groups, ether groups and the like. They may contain one —SH group but the more highly preferred ones because of the superior results obtained are those containing two —SH groups.

Examples of these include, among others, 1,3-dithioglycerol, 1,2-dithioglycerol, 1,4-butanedithiol, 1,5-pentanedithiol, bis(2-mercaptoethyl)sulfide, bis(2-mercaptoethyl)ether, mercaptoacetic acid ester of ethylene glycol, ethylcyclohexyl dimercaptan, 1-mercapto-4-(mercaptobutyl)cyclohexane, 1,4-dimercaptocyclohexane, 1-pentanethiol, 2-hexanethiol, and the like. Particularly preferred dimercaptans to be employed include the dimercapto-substituted aliphtic and cycloaliphatic hydrocarbons, and the hydroxy, ester- and ether-substituted dimercapto-substituted aliphatic cycloaliphatic hydrocarbons containing not more than 8 carbon atoms. Especially preferred are the dithio-substituted alkanols.

The curing compositions of the present invention may be prepared by any suitable method. They are preferably prepared by mixing the above-noted polymercaptan containing more than 2 —SH groups and the liquid dimercaptans together in any order. If the polymercaptans are solid materials, the mixing may be accelerated by the application of heat. It is also possible and desirable in some cases for some or all of the components in situ. Thus, one may utilize a polymercaptan containing epichlorohydrin and add H₂S so as to convert the epichlorohydrin to 1,3-dithioglycerol.

The proportions employed in making the compositions may vary over a considerable range. In general, use sufficient dimercaptan to obtain the desired fluidity. Preferred amounts of dimercaptan vary from about 1% to about 50% by weight of the polymercaptan curing agent. Particularly preferred amounts vary from about 5% to 35% by weight.

The above-described compositions will be fluid mixtures which may be stored indefinitely without danger of gelations. As the composition possesses active mercapto groups, they can be used as intermediates for further reaction as with acids, aldehydes, ketones and the like.

The above-described compositions are particularly suited for use as curing agents for polyepoxides as described hereinabove. The polyepoxides that may be cured by the new compositions comprise those compounds possessing more than one and preferably at least 2 vicinal epoxy groups, i.e.,

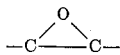

groups. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleat, butyl inoleate, ethyl 9,12-octadecadienoate, butyl 9,12,15-octadecatrienoate, butyl eleostearate, monoglycerides of tung oil fatty acids, monoglycerides of soybean oil, sunflower rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl)adipate, di(2,3-epoxybutyl)oxalate, di(2,3-epoxyhexyl)succinate, di(3,4-epoxybutyl)maleate, di(2,3-epoxyoctyl)pimelate, di(2,3-epoxybutyl)phthalate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(5,6 - epoxytetradecyl)diphenyldicarboxylate, di(3,4-epoxyheptyl)sulfonyldibutyrate, tri(2,3-epoxybutyl)-1,2,4-butanetricarboxylate, di(5,6 - epoxypentadecyl)tartarate, di(4,5 - epoxytetradecyl)maleate, di(2,3-epoxybutyl)azelate, di(3,4-epoxybutyl)citrate, di(5,6-epoxyoctyl)cyclohexane-,2-dicarboxylate, di(4,5-epoxyoctadecyl)malonate.

Another group of the epoxy-containing materials includes those epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl 3,4-epoycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eiconsanedioate, dihexyl 6,7,10,11-diepoxyhexadecanedioate, didecyl 9-epoxy-ethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl)pentane (epoxy value of 0.514 eq./100 g.) and the like and mixtures thereof.

The amount of new curing agent compositions to be employed in the cure of the polyepoxide may vary within certain limits. In general, the polyepoxides are combined with at least .8 equivalent of the polymercaptan. As used herein "equivalent" amount refers to that amount needed to furnish one —SH group per epoxy group to be reacted. This includes the —SH groups in the dimercaptan diluent as well as that in the polymercaptan. Preferably the polymercaptans and polyepoxides are combined in chemical equivalent ratios varying from .8:1.5 to 1.5:0.8.

It is preferred in some cases to employ activators for the cure. Examples of these include, among others, phenols, sulfides, organic phosphines, organic arsines, organic antimony compounds, amine salts or quaternary ammonium salts, etc. Preferred activators are the phenols, phosphines, arsines, amines, and sulfides, such as, for example benzyldimethylamine dicyandiamide p,p'-bis(dimethylaminophenyl)methane, pyridine, dimethyl aniline, dimethylethanolamine, methyldiethanolamine, morpholine, dimethylaminopropylamine, dibutylaminopropylamine, stearyldimethylamine, tri-n-butyl amine, N,N-dibutyl butylamine, tri-n-hexylamine, ethyl di-n-propylamine, phenylene diamine, diethylene triamine, dibutyl sulfide, dioctyl sulfide, dicyclohexyl sulfide and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like, and mixtures thereof.

Preferred activators to be used are the sulfides, phosphines and tertiary amines, and more preferably the mono- and diamines wherein the amine hydrogens have been replaced by aliphatic, cycloaliphatic or aromatic hydrocarbon radicals containing not more than 15 carbon atoms, such as, for example, the trialkyl amines, triaryl amines, triarylalkylamines, alkyl arylalkylamines, tricycloalkylamines, alkyl dicycloalkylamines, diaminoalkanes, dialkylene triamines, phenylene diamines and di(aminoaryl)-alkanes. Preferred amine salts are the hydrochloride, sulfate and acetate of the above-described preferred amines. The preferred quaternary salts are those of the formula:

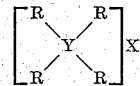

wherein Y is nitrogen, R is an alkyl, aryl or arylalkyl radical, preferably containing no more than 12 carbon atoms, and X is chlorine.

The activators noted above are generally employed in amounts varying from 0.1 part to 4 parts per 100 parts of polyepoxide, and preferably from 1 part to 3 parts per 100 parts of polyepoxide.

Other types of diluents may also be utilized. These may be volatile solvents which escape from the polyepoxide compositions containing the adduct by evaporation before or during the curing such as esters, such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average epoxide equivalents weight of the polyepoxide.

Various other ingredients may be mixed with polyepoxide subjected to cure with the novel adducts including pigments, filler, dyes, plasticizers, resins, and the like.

The polyepoxides may be cured with the new polymercaptans compositions by merely mixing the two components together, preferably in the presence of the above-noted activators. The cure time may vary from a few minutes to a few days depending on the type and quantity of reactants and presence of catalyst. In general, in the presence of activators, the cure takes place readily at room temperature. Fast reaction may be obtained, of course, by applying heat. Preferred temperatures range from about 20° C. to 200° C. With small castings, it is preferred to cure at room temperature and then post cure for a few minutes.

The new compositions are particularly suited for use as surface coatings for metal, wood, concrete, and the like. In this case, the liquid solution is spread out as a thin film allowed to cure at room temperature or by application of heat.

Another important application of the use of the new polymercaptan compositions as curing agents for polyepoxides is in the preparation of laminates or resinous particles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like. It is useful to prepare the laminates from woven glass cloth that has been given prior treatment with well known finishing or sizing agents therefor, such as chrome methacrylate or vinyl trichlorosilane.

In preparing the laminate, the sheets of fibrous materials are preferably first impregnated with the mixture of the polyepoxide, polymercaptan composition and activator. This conveniently accomplished by dissolving the polymercaptan in a solvent and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured by the application of heat. A plurality of the impregnated sheets can be superimposed and the assembly cured in a heated press under a pressure of about 25 to 500 or more pounds per square inch. The resulting laminate is extremely strong and resistant against the action of organic and corrosive solvents.

The new compositions of the invention containing the polyepoxides are particularly outstanding as adhesives. In this application they can be used as a paste or solution depending on the method of preparation as described above. Other materials may also be included in the composition, such as pigments, plasticizers, stabilizers and reinforcing fillers, such as aluminum powder, asbestos, powdered mica, zinc dust, bentonite, ground glass fibers, Moneta clay and the like. These fillers are preferably used in amounts varying from about 10 parts to 200 parts per 100 parts of the polyepoxide and polymercaptan compound. Other materials that may be included include other types of resins, such as phenol-aldehyde resins, urea-aldehyde resins, furfural resins, polyacetal resins, carbonate resins, polyamide resins, and the like.

The compositions may be used in the bonding of a great variety of different materials, such as metal-to-metal to other materials, such as plastic, wood-to-wood, glass-to-glass, glass-to-metal, and the like. They are of particular value, however, in the bonding of metals such as aluminum-to-aluminum and steel-to-steel. When applied as an adhesive, the compositions may simply be spread on the desired surface to form films of various thicknesses, e.g., 0.5 mils to 30 mils, and then the other surface superimposed and heat applied. Curing pressures can be light contact pressures up to about 500 p.s.i.

When the compositions are used as adhesives for metal-to-metal bonding, it has sometimes been found advantageous to impregnate cotton, rayon, synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have not only excellent strength at ordinary temperatures, but also retain good strength even though heated at quite elevated temperatures for long periods of time. A preferred tape for such use comprises a glass fiber textile impregnated or coated with a mixture of the polyepoxide, phthalocyanine compound and atomized aluminum powder or dust.

To illustrate the manner in which the invention may be carried out the following examples are given. It is to be understood, however, that the examples are for the purpose of illustration and that the invention is not to be regarded as limited to any of the specific conditions or reactants recited therein. Unless otherwise specified parts described in the examples are parts by weight. The polyethers referred to by letter are those in U.S. 2,633,458.

*Example I*

This example illustrates the preparation of a curing agent composition from (1) an adduct of hydrogen sulfide and a polyglycidyl ether of a phenol-aldehyde resin, and (2) dithioglycerol, and its use for curing Polyether A.

A hydrogen sulfide adduct was prepared by reacting hydrogen sulfide with a glycidyl ether of phenol-formaldehyde resin so as to give a product having a mercaptan value of 0.45 eq./100 g. (see preparation above). 75 parts of this adduct was mixed with 25 parts of 1,3-dithioglycerol to form a fluid liquid composition having a mercaptan value of 0.69 eq./100 g.

75.6 parts of this mixture was combined with 100 parts of Polyether A and 0.13 part of benzyldimethyl amine. The resulting composition was then spread as a sheet and cured for 2 hours at 100° C. The resulting cured sheet had the following properties.

| | |
|---|---|
| Heat distortion point, ° C. | 56.5 |
| Flexural strength, $10^{-3}$ p.s.i. | 14.3 |
| Modulus, $10^{-5}$ p.s.i. | 4.15 |
| Tensile strength: Ultimate, $10^{-3}$ p.s.i. | 6.29 |
| Percent solvent pick-up, 1 month: | |
| Water | 0.92 |
| Benzene | 0.54 |
| 10% NaOH | 0.69 |
| 10% sulfuric acid | 0.78 |

*Example II*

100 parts of a mixture made up of 85 parts Polyether A and 15 parts butyl glycidyl ether was combined with 75.6 parts of the curing agent composition defined in Example I. To this mixture was added 0.2 part of benzyldimethylamine. The resulting mixture was spread out as a sheet and cured for 7 days at 25° C. The resulting cured product had the following properties.

| | |
|---|---|
| Flexural strength, $10^{-3}$ p.s.i. | 24.0 |
| Modulus, $10^{-5}$ p.s.i. | 3.51 |
| Tensile strength: Ultimate, $10^{-3}$ p.s.i. | 6.72 |

Example III

This example illustrates the preparation of a curing agent composition from (1) an adduct of hydrogen sulfide and a polyglycidyl ether of a phenol-aldehyde resin, and (2) 1-mercapto-4-(2-mercaptoethyl)cyclohexane.

65 parts of the hydrogen sulfide adduct of the glycidyl ether of phenol-formaldehyde resin as described in Example I was mixed with 35 parts of 1-mercapto-4-(2-mercaptoethyl)cyclohexane so as to give a fluid liquid composition having a mercaptan value of 0.59 eq./100 g.

100 parts of Polyether A was combined with 88 parts of the above-described curing agent composition. To this mixture was added 0.13 part of benzyldimethyl amine. The resulting composition was then spread as a sheet and cured for 1 hour at 100° C. The properties of the resulting sheet are as follows.

| | |
|---|---|
| Heat distortion point, ° C. | 57.5 |
| Flexural strength, $10^{-3}$ p.s.i. | 14.5 |
| Modulus, $10^{-5}$ p.s.i. | 4.3 |
| Tensile strength: Yield, $10^{-3}$ p.s.i. | 9.9 |
| Percent solvent pick-up, 1 month: | |
| Water | 0.56 |
| 10% NaOH | .40 |
| 10% sulfuric acid | .42 |

Example IV

This example illustrates the use of the new curing systems for preparation of a coating for concrete blocks.

100 parts of Polyether A was combined with 117 parts of refined coal tar. To this mixture was added 75 parts of the curing agent prepared as shown in Example I and 1 part of tris(dimethylaminomethyl)phenol. This mixture was spread out with a 6 mil doctor blade on concrete blocks which has been prepared from fine aggregate and cement according to ASTM methods and aged in water for 30 days. The coating dried in less than 1 hour at room temperature to form a hard resistant coating.

Example V

A composition was prepared by mixing 100 parts of a mixture of Polyether A and butyl glycidyl ether (95+5), 75.6 parts of the curing agent defined in Example I. This mixture which had a pot life of 12 hours was used as an adhesive to bond old concrete to new. After 2 days of cure, pressure was applied and the concrete broke at 440 p.s.i., but the adhesive bond still remained intact.

Example VI

This example illustrates the use of the compositions of the invention as adhesives for aluminum, steel and the like.

The following two formulations were prepared:

(I)

| | |
|---|---|
| Polyether A | 100 |
| H$_2$S adduct in Ex. I+dithioglycerol | 75.6 |
| Benzyldimethyl amine | 0.13 |

(II)

| | |
|---|---|
| Polyepoxide in Ex. V | 100 |
| H$_2$S adduct in Ex. I+dithioglycerol | 75.6 |
| Benzyldimethylamine | 0.13 |

These mixtures were applied to cleaned aluminum and steel surfaces and the surfaces pressed together and cured at 100° C. and 25° C. Very good adhesion was obtained. The results obtained with aluminum lap joints are shown in the following table:

| Formula | Cure temperature | Tensile strength |
|---|---|---|
| I | 100° C | 6,978 p.s.i. |
|   | 25° C | 1,664 p.s.i. |
| II | 100° C | 3,780 p.s.i. |
|   | 25° C | 2,432 p.s.i. |

Example VII

Examples I to V are repeated with the exception that Polyether A is replace with Polyether B. Related results are obtained.

Example VIII

Examples I to VI are repeated with the exception that the amine accelerator is replaced by the following: dibutyl sulfide, diamyl sulfide, tricyclohexyl phosphine and tributyl amine. Related results are obtained.

Example IX

Examples I to VI are repeated with the exception that the fluid dimercaptan is replaced by the following: 1,6-dimercapto-2-hydroxycyclohexane and di(mercaptoethyl) maleate, related results are obtained.

We claim as our invention:

1. A process for curing and resinifying polyepoxides having more than one vic-epoxy group to convert them to hard insoluble infusible products which comprises mixing and reacting the polyepoxide with a curing agent comprising a mixture of a viscous liquid to solid polymercaptan possessing more than 2 —SH groups, and from 1% to 50% by weight of the curing agent of a fluid liquid polymercaptan containing 2 —SH groups selected from the group consisting of dimercapto-substituted alkanols containing up to 8 carbon atoms, dimercapto-substituted alkanes containing up to 8 carbon atoms, bis(mercaptoethyl)sulfide, bis(2-mercaptoethyl)ether, mercaptoacetic acid ester of ethylene glycol, ethylcyclohexyl dimercaptan, 1-mercapto-4-(mercaptobutyl)cyclohexane, 1,4-dimercaptocyclohexane, 1,6-dimercapto-2-hydroxycyclohexane, and di(mercaptoethyl)maleate, the polymercaptans in the curing agent and the polyepoxide being combined in a chemical equivalent ratio varying from 0.8:1.5 to 1.5:8, as used herein equivalent amount means that amount needed to furnish one —SH group per epoxy group.

2. A process for curing and resinifying polyepoxides having more than one vic-epoxy group per molecule to convert the polyepoxide into hard insoluble infusible products which comprises mixing and reacting the polyepoxide with a curing agent comprising a mixture of (1) an adduct of hydrogen sulfide and a polyepoxide at least three epoxy groups, and from 1% to 50% by weight of the curing agent of (2) a liquid dimercaptan containing 2 —SH groups selected from the group consisting of dimercapto-substituted alkanols containing up to 8 carbon atoms, dimercapto-substituted alkanes containing up to 8 carbon atoms, bis(mercaptoethyl)sulfide, bis(2-mercaptoethyl)ether, mercaptoacetic acid ester of ethylene glycol, ethylcyclohexyl dimercaptan, 1-mercapto - 4 - (mercaptobutyl)cyclohexane, 1,4-dimercaptocyclohexane, 1,6-dimercapto - 2 - hydroxycyclohexane, and di(mercaptoethyl) maleate, and an activator for the epoxy-mercaptan reaction, the adduct and liquid dimercaptan and the polyepoxide being combined in such quantities that the polymercaptans present in the adduct and the liquid dimercaptan, and the polyepoxides are present in a chemical equivalent ratio varying from 0.8:1.5 to 1.5:8, as used herein equivalent amount means that amount needed to furnish one —SH group per epoxy group.

3. A process as in claim 2 wherein the adduct is the reaction product of hydrogen sulfide and a glycidyl polyether of a polyhydric phenol having more than 3 glycidyl ether groups.

4. A process as in claim 2 wherein the adduct is the reaction product of hydrogen sulfide and a glycidyl polyether of a phenol formaldehyde resin.

5. A process as in claim 2 wherein the adduct is the reaction product of hydrogen sulfide and a glycidyl polyether of tetrakis(4-hydroxyphenyl)alkane.

6. A process as in claim 2 wherein the activator is a tertiary amine.

7. A process as in claim 2 wherein the activator is an alkyl sulfide.

8. A process as in claim 2 wherein the dimercaptan is dithioglycerol.

9. A process as in claim 2 wherein the polyepoxide is a glycidyl ether of 2,2-bis(4-hydroxyphenyl)propane.

10. A process as in claim 2 wherein the dimercaptan is ethylcyclohexyl dimercaptan.

11. A composition which can be converted to a hard insoluble infusible product comprising a mixture of a polyepoxide having more than one vic-epoxy group and a curing agent comprising a mixture of a viscous liquid to solid polymercaptan possessing more than 2 —SH groups, and from 1% to 50% by weight of the curing agent of a fluid liquid polymercaptan containing 2 —SH groups selected from the group consisting of dimercapto-substituted alkanols containing up to 8 carbon atoms, dimercapto-substituted alkanes containing up to 8 carbon atoms, bis(mercaptoethyl)sulfide, bis(2-mercaptoethyl)ether, mercaptoacetic acid ester of ethylene glycol, ethylcyclohexyl dimercaptan, 1-mercapto-4-(mercaptobutyl)cyclohexane, 1,4-dimercaptocyclohexane, 1,6-dimercapto-2-hydroxycyclohexane, and di(mercaptoethyl) maleate, the polymercaptans in the curing agent and the polyepoxide being combined in a chemical equivalent ratio varying from 0.8:1.5 to 1.5:8, as used herein equivalent amount means that amount needed to furnish one —SH group per epoxy group.

12. A composition which can be converted to a hard insoluble infusible product comprising a mixture of a polyglycidyl ether of 2,2-bis(4-hydroxyphenyl)propane, and a curing agent comprising a mixture of an adduct of hydrogen sulfide and a phenol-formaldehyde glycidyl ether, and from 1% to 50% by weight of the curing agent of a fluid liquid dimercaptan selected from the group consisting of dimercapto-substituted alkanols containing up to 8 carbon atoms, dimercapto-substituted alkanes containing up to 8 carbon atoms, bis(mercaptoethyl)sulfide, bis-(2-mercaptoethyl)ether, mercaptoacetic acid ester of ethylene glycol, ethylcyclohexyl dimercaptan, 1-mercapto-4-(mercaptobutyl)cyclohexane, 1,4-dimercaptocyclohexane, 1,6-dimercapto-2-hydroxycyclohexane, and di(mercaptoethyl)maleate, the adduct and the liquid dimercaptan and the polyglycidyl ether being combined in such quantities that the polymercaptans present in the adduct and the liquid dimercaptan, and the polyepoxide are present in a chemical equivalent ratio varying from 0.8:1.5 to 1.5:8, as used herein equivalent amount means that amount needed to furnish one —SH group per epoxy group.

References Cited by the Examiner
UNITED STATES PATENTS

| | | | |
|---|---|---|---|
| 2,633,458 | 3/1953 | Shokal | 260—47 |
| 2,921,921 | 1/1960 | Greenspan | 260—830 |

MURRAY TILLMAN, *Primary Examiner.*

PAUL LIEBERMAN, *Assistant Examiner.*